(12) United States Patent
Braddock, Jr.

(10) Patent No.: US 7,047,524 B1
(45) Date of Patent: May 16, 2006

(54) OBJECT ORIENTED ADN AND METHOD OF CONVERTING A NON-OBJECT ORIENTED COMPUTER LANGUAGE TO AN OBJECT ORIENTED COMPUTER LANGUAGE

(75) Inventor: Daniel M. Braddock, Jr., Austin, TX (US)

(73) Assignee: Hyperformix, Austin, TX (US)

( * ) Notice: Subject to any disclaimer, the term of this patent is extended or adjusted under 35 U.S.C. 154(b) by 695 days.

(21) Appl. No.: 09/753,192

(22) Filed: Dec. 30, 2000

(51) Int. Cl.
G06F 9/45 (2006.01)

(52) U.S. Cl. .................................... 717/136
(58) Field of Classification Search ........ 717/136–138; 703/13–22
See application file for complete search history.

(56) References Cited

U.S. PATENT DOCUMENTS

| | | | | |
|---|---|---|---|---|
| 5,845,119 | A * | 12/1998 | Kozuka et al. | 717/107 |
| 6,002,874 | A * | 12/1999 | Bahrs et al. | 717/157 |
| 6,253,215 | B1 * | 6/2001 | Agesen et al. | 707/206 |
| 6,275,983 | B1 * | 8/2001 | Orton et al. | 717/116 |
| 6,467,079 | B1 * | 10/2002 | Ettritch et al. | 717/108 |
| 6,523,171 | B1 * | 2/2003 | Dupuy et al. | 717/136 |
| 6,606,742 | B1 * | 8/2003 | Orton et al. | 717/140 |
| 6,684,261 | B1 * | 1/2004 | Orton et al. | 719/328 |

OTHER PUBLICATIONS

Champeaux et al. The process of object-oriented design. IEEE. 1992. pp. 45-62.*

Subramaniam et al. Deriving an Object Model from Legacy Fortran Code. IEEE. 1996. pp. 3-12.*

The UNIX Programming Environment by Brian W. Kernighan and Rob Pike, Bell Laboratories, Murray Hill, New Jersey; Prentice-Hall Software Series, Prentice-Hall, Inc., Englewood Cliffs, New Jersey 07632; Copyright 1984, Bell Laboratories, Inc.

Java Language Reference, Second Edition by Mark Grand; O'Reilly & Associates, Inc. 101 Morris Street, Sebastopol, CA 05472, Copyright 1997 O'Reilly & Associates.

SES/strategizer Version 2.2, Strategizer Reference; Copyright 1996-1999 by Scientific and Engineereing Software, Inc.; Scientific and Engineering Software, Inc., 4301 Westbank Drive, Bldg. A., Austin, TX 78746.

(Continued)

Primary Examiner—Wei Y. Zhen
(74) Attorney, Agent, or Firm—Schultz & Associates P.C.

(57) ABSTRACT

A method for converting a non-object oriented language to an object oriented language is shown. First, an existing object oriented language must be selected. Next, a non-object oriented language is selected. This is the language the programmer desires to be converted to an object oriented language. The requirements for the new object oriented language are then defined. Next, the specific syntax and grammar are selected. Then the object oriented extensions are developed. The object oriented extensions allow for the existing language and data structure to be developed coextensive in the object oriented environment. Next, the new object oriented language is prepared based upon the criteria outline previously. The Object Oriented ADN including an application logic function, data types and scopes, a class for message instancing, client workload models, server process infrastructure, database models, operating system models, statistics capability, utility classes, and garbage collection.

18 Claims, 32 Drawing Sheets

OTHER PUBLICATIONS

ADN Programming for SES/strategizer Users, A 2.5 Day Course, Version DO998, by Jeff Brumfield, Ph.D; Copyright 1998 by Jeff Brunfield, Ph.D., Department of Computer Science University of Texas at Austin, Austin, Texas 78712.

ADN Programming for Strategizer Users, A 2-Day Course, Version F0999, by Jeff Brumfield, Ph.D., Copyright 1988-99 Jeff Brumfield, Ph.D., Department of Computer Science, University of Texas at Austin, Austin, Texas 78712.

* cited by examiner

FIG. 2-1

// $Header: /2.0/Model/system.adn 27   5/15/98  3:20p Dan $
// System.adn - 05/15/98 09:45

// ================================
// Model global controls (intended mainly for regression testing)
//     set to 2000 for release 2.0 (the default)
//     set to 1300 for regression testing against release 1.3
// ================================
Constant DiskAssignmentAlgorithm         = 2000;
Constant RandomSeedAssignmentAlgorithm   = 2000;
// ================================
// Operating system interface constants (must match Strategizer internals)
// *** WARNING: changes in this section will cause execution time failure
// ================================

// The Strategizer Operating System Model (a new feature for release 2.0)
// --------------------------------

// INTRODUCTION

// The operating system exists as a layer of software logic (and associated processes)
// that lies between software processes running in problem state (as in release 1.3)
// and the underlying hardware.

// An association is made between an operating system name (the first column in the
// CSE.ops file) and an ADN OS behavior name (the sixth column of the CSE.ops file).
// Note that the operating system names are selected from a list (based on the
// CSE.ops file) via the GUI for each computer in a Strategizer model.

// Instances of an operating system are created for each computer that runs an
// operating system with an associated ADN OS behavior name.
// The default for release 2.0 is to define the ADN behavior "ADNosSvc" for all named
// operating systems except "Generic" and "generic_operating_system".
// The operating system name is passed as a second parameter to the ADNosSvc behavior.

// A knowledgeable Strategizer user can create new operating system behaviors
// based on an understanding of the ADNosSvc behavior in this file (System.adn).
// Such user extensions must be added to the end of the System.adn file or included
// via an ADN Include statement at the end of the System.adn file.

FIG. 2-2

```
// A few words about the System.adn file. This file is loaded automatically at model
// initialization prior to the processing of ADN source generated or included by the GUI.
// A search is made of the directory containing the model first, then the installation area for
// the System.adn file. The location of the System.adn file selected is logged in the trace file.
// When modifications are planned, it is recommended that a copy of the System.adn file
// be made from the installation area to the directory containing the model.

// ADN PROCESSES AND STATE

// Software processes can execute in problem state and additionally in supervisor
// state (a new feature in release 2.0).

// Processes that startup in problem state switch to supervisor state at specific points
// (OS hook locations) to execute an operating system service and then return to problem state.

// Processes that startup in supervisor state (the OS server processes) remain in
// supervisor state.

// ---------------------------------------------------------------------------
// OS behavior hooks are implemented as cases of an ADN switch statement.
// The logic located at each hook is described along side the corresponding hook constant.
// ---------------------------------------------------------------------------

Constant INITIALIZEsvc = 0;   // The INITIALIZEsvc hook is executed once for each associated
              /                      // computer by a special initialization process.
             202                     // The purpose of this logic is to establish an operating system instance
                                     // including its server processes and state data.
                                     // Operating system data is maintained uniquely for each OS instance by using
                                     // the functions osSetData and osGetData.
                                     // Any user options and associated processing are included in this section.
                                     // Refer to Case(INITIALIZEsvc) in the ADNosSvc behavior and the
                                       associated
                                     // server behaviors ADNosNFS, ADNosVolumeMgr, and ADNosTaskMgr
                                       for additional
                                     // information.

// In the following hooks the active process switches from problem to supervisor state and executes the top // level (or main operating system behavior) in a manner very similar to a behavior call. The hook identifier
```

FIG. 2-3

```
// is passed as the only parameter. In the hook descriptions that follow, example use details are provided by
// the SES-supplied ADNosSvc behavior.

Constant EXECUTEsvc = 1;    // The EXECUTEsvc hook is executed at the end of the software part of
                            // Execute statement processing, just before the resulting request vector
                            // is sent to the hardware.
                            // Individual elements in the request vector are checked for remote disk IO
                            // and IO operations involving files located on volumes. Substitution or
                            // modification of the original requests are made as appropriate.
                            // Refer to Case(EXECUTEsvc) in the ADNosSvc behavior and the ADNosNFS and
                            // ADNosVolumeMgr behaviors for additional detail.

Constant SENDsvc = 2;       // The SENDsvc hook is executed at the end of the software part
                            // of Send statement processing, just before the request is sent to the
                            // hardware. Upon exit from this section, the resulting request is sent
                            // to the hardware.
                            // Use of this hook is reserved for future development of network related
                            // OS services.

Constant SENDWAITsvc = 3;   // The SENDWAITsvc hook is executed early in the processing of an incoming
                            // message from a Send statement.
                            // Upon exit from this section, control is passed to the Receive statement
                            // for processing of the message data fields.
                            // Use of this hook is reserved for future development of network related
                            // OS services.

Constant RECEIVEsvc = 4;    // The RECEIVEsvc hook is executed early in the processing of an incomming
                            // message from a Send statement.
                            // Upon exit from this section, control is passed to the Receive statement
                            // for processing of the message data fields.
                            // Use of this hook is reserved for future development of network related
                            // OS services.

Constant REPLYsvc = 5;      // The REPLY svc hook is executed at the end of the software part
                            // of the Reply clause (part of the Receive statement), just before the
                            // request is sent to the hardware.
                            // Use of this hook is reserved for future development of network related
                            // OS services.

Constant TASKSTARTsvc = 6;  // The TASKSTARTsvc hook is executed when a Startup or Thread statement
                            // creates a new task (i.e. process or thread).
                            // The operating system task count is incremented. If the maximum number
                            // of tasks has already been reached, the creation of a new task is
                            // inhibited by blocking the current process (the requestor) until the task
                            // count drops below the maximum.
                            // Refer to Case(TASKSTARTsvc) in the ADNosSvc behavior and the ADNosTaskMgr
                            // behavior for additional details.
```

FIG. 2-4

Constant TASKENDsvc=7;   // The TASKENDsvc hook is executed whenever a process or thread terminates.
                        // The operating system task count is decremented. If the task count is
                        // greater than the maximum, the first blocked task is allowed to continue.
                        // Refer to Case(TASKENDsvc) in the ADNosSvc behavior and the ADNosTaskMgr
                        // behavior for additional details.

//----------------------------------------------------------------------------------
// The "hr" (hardware request data) utility functions are used to access specific data necessary
// to support the current operating system functionality. In release 2.0 this is limited to requests
// generated by the Execute statement.
// The constants defined below are used in combination with the following data access utility
// functions hrGetDatahrSetData to access scalar values, and hrGetDataX/hrSetDataX to access
// vector (or subscripted) values.

// CAUTION: In considering user defined extensions to the operating system the prospective user
// should become familiar with the data currently accessible at the ADN level.
// ----------------------------------------------------------------

Constant HRexecSize =4;   //Used with hrGetData to obtain the size of the Execute request vector.
                        // The vector consists of the CPU request as first element (when present)
                        // followed by Read and/or Write requests elements.

Constant HRexecReqType = 5;  // Used with hrGetDataX to obtain the type of the Execute request element
                            // Returns one of the following: ReadType, WriteType, SendType, or CpuType.

Constant HRnfsProc =6;   // Used with hrSetData and hrGetData to save and retrieve the process id
                        // of the local NFS process.

Constant HRioReq =7;   // Used with hrGetDataX to obtain the handle to an IO request structure
                     // (element of the Execute vector).

Constant HRresetReq = 8;  // Used with hrSetDataX to set the specified element in the Execute request
                        // vector to null. This action is done when the original request element
                        // has been replaced by a more detailed operating system representation.

FIG. 2-5

Constant HRlocalIO = 9;   // Used with hrSetData to initiate a local IO request using the specified
                          // IO request handle.

Constant HRpostExecute = 10;   // Used with hrSetData to post a completion event to the original Execute
                               // synchronization control logic. (All parts of an Execute statement must
                               // be completed before a process exits the Execute statement.)

Constant HRkbytes = 11;   // Used with hrGetDataX to obtain the total data bytes (in Kbytes) for the
                          // specified IO request Constant HRvolumeHandle = 12;   // Used with hrGetDataX to obtain the handle of the associated volume for
                                // LocVolType and RemVolType IO requests.
                                // The handle is used by volGetStripeSize() and volGetStripedDiskNumber()
                                // volume manager utility functions.

Constant HRkbytesOffset = 13;   // Used with hrGetDataX to obtain the kbyte offset of the first IO record
                                // in the specified File based on the value of the FirstIo parameter on an
                                // execute Read or Write request. IfFirstIo is not specified a random
                                // record number between 0 and max-1 is used as the first IO record.
                                // The offset is used by the volume manager to determine the disk on which
                                // the first IO record resides.

Constant HRreqType = 14;   // Used with hrGetDataX for Read and Write execute elements.
                           // Returns one ofLocDiskType, RemDiskType, LocVolType, RemVolType.

Constant HRioReqDisk = 15;   // Used with hrGetDataX to make a copy of the specified IO request Constant HRioReqCopy = 16;   // Used with hrSetDataX to set the disk number for the specified IO request Constant HRioReqKbytes = 17;   // Used with hrSetDataX to set the amount of data to be transferred Constant HRioReqNumber = 18;   // Used with hrSetDataX to set the starting record for the specified IO request // ----------------------------------
// Hardware request element type.
// Returned by HRexecReqType when used with hrGetDataX.

FIG. 2-6

```
// ------------------------------------------------
Constant ReadType = 0;
Constant WriteType = 1;
Constant SendType = 2; // currently not needed
Constant CpuType = 3;

// ------------------------------------------------
//IO request context type.
// Returned by HRreqType when used with hrGetDataX.
// ------------------------------------------------
Constant LocDiskType = 0;
Constant RemDiskType = 1;
Constant LocVolType = 2;
Constant Rem V olType = 3;
Constant NonIoType = 4;

//======================================
// ---------- end of operating system interface constants ----------
//======================================

//miscellaneous parameters (used by ADNosNFS behavior)
// ------------------------------------------------------

Constant RPCreadReq = 40.0 / 1024.0;    // kbytes
Constant RPCwriteAck = 40.0 / 1024.0;   // kbytes // task manager trace control (use for debugging only)
// ------------------------------------------
Constant TASKtrace = 0;

//==========================================
// default operating system service "main" behavior (referenced in CSE.ops)
// ==========================================

Behavior ADNosSvc( svc_type, operating_system_name, computer_name, memory_structure,
    page_size, instr_per_page)
//NOTE: Only the "svc_type" parameter is available on all but the INITIALIZEsvc case.    ~206

Switch( svc_type ) {
```

FIG. 2-7

```
Case( INITIALIZEsvc ) {

//=========================================================
// This logic is executed in 0 simulated time to initialize an instance of this
// operating system on each computer that specifies ADNosSvc in the CSE.ops file.
// The "operating_system_name" (second behavior parameter) corresponds to the // name in column one of the CSE.ops file. This name may be used to differentiate
// between the initialization of differently named operating systems.
//========================================================= osSetData("svcState", 1);   // required for initialization process

//----------------------------------------------------------
// Startup Memory Pageout Manager (required by memory model)
//----------------------------------------------------------
Startup proc = MemoryPageoutManager( memory_structure, page_size, instr_per_page)
               Priority 101;
processSetName(proc, "mpm-" +computer_name);

// OS service Master controls affect all operating system instances that
// specify use of the ADNosSvc behavior in column 6 of the CSE.ops file.

// active tasks control process
If ( osGetData("taskCountMax") > = 0 ) {
      osSetData("taskCount" ,0);
      Startup proc = ADNosTaskMgr() Priority 101;
      osSetData("osTaskMgr" ,proc);
}

// NFS server process
Startup proc = ADNosNFS() Priority 101 Options "SetStatsFlag";
osSetData("osNFS" ,proc);
processSetName(proc, "nfs-" +computerGetName());

// volume manager
Startup proc = ADNosVolumeMgr() Priority 101;

osSetData("os VolMgr",proc);
```

Case( EXECUTEsvc ) {

// this logic is executed in 0 simulated time to send any volume or remote IO requests
// included in an Execute statement to the local Volume manager or NFS server execSize = hrGetData(HRexecSize);
i = 0;
While( i < execSize ) {
        reqType = hrGetDataX(HRexecReqType,i);
        Switch ( hrGetDataX(HRreqType,i) ) {
                Case( LocDiskType ) {
                    // no OS service required
                }
                Case( RemDiskType ) {
                    ioReq = hrGetDataX(HRioReq,i);
                    Kbytes = hrGetDataX(HRkbytes,i);
                    Send osGetData("osNFS") ("client_side" ,hrGetDataX(HRnfsProc,i),
                            ioReq,reqType,Kbytes,0,0); // async
                    hrSetDataX(HRresetReq,i,0) ;
                }
                Case( LocVolType ) {
                    ioReq = hrGetDataX(HRioReq,i);
                    Kbytes = hrGetDataX(HRkbytes,i);
                    KbytesOffset = hrGetDataX(HRkbytesOffset,i);
                    volumeHandle = hrGetDataX(HRvolumeHandle,i);
                    Send osGetData(" os VolMgr") (0,ioReq,reqType,Kbytes,KbytesOffset,
                            volumeHandle); // async
                    hrSetDataX(HRresetReq,i,0);
                }
                Case( Rem VolType ) {
                    ioReq = hrGetDataX(HRioReq,i);
                    Kbytes = hrGetDataX(HRkbytes,i);
                    kbytesOffset = hrGetDataX(HRkbytesOffset,i);
                    volumeHandle = hrGetDataX(HRvolumeHandle,i);
                    Send osGetData("osNFS") (" clienT_side" ,hrGetDataX(HRnfsProc,i),
                            ioReq,reqType,Kbytes,
```

```
                        kbytesOffset,volumeHandle); // async
                hrSetDataX(HRresetReq ,i,0);

}
            Case( NonIoType ) {
                    // no OS service required

}
        }
        i = i + 1;
    }
}
Case( SENDsvc ) {
    // Execute Cpu 0.000001;
}
Case( SENDWAITsvc ) {
    // Execute Cpu 0.000001;
}
Case( RECEIVEsvc ) {
    // Execute Cpu 0.000001;
}
Case( REPLYsvc ) {
    // Execute Cpu 0.000001;
}
Case( TASKSTARTsvc ) {

// increment task count
    taskCount = osGetData("taskCount") + 1;
    osSetData("taskCount" ,taskCount);

// if task count exceeds max put new task in task manager's queue
    // and put new task into wait state
    If (taskCount > osGetData("taskCountMax") ) {
        Send osGetData(" osT askMgr") (threadGetCurrentId());
        If ( TASKtrace ) {
            Print stringFormat("%.6f" ,simGetTime()),
                    "ADNosTaskMgr: task" ,threadGetCurrentId()," suspended";
        }
        threadWaitForSignal();

```
        }
        Case( TASKENDsvc ) {
                // decrement task count
                taskCount = osGetData("taskCount") - 1;
                osSetData("taskCount" ,taskCount);

// if there is a waiting task, signal task manager
                If ( taskCount > = osGetData("taskCountMax") ) {
                        processSignal( osGetData("osTaskMgr") );
                }
            }
      }
      Return( svc_type );
}

// Maximum number of active tasks manager behavior
//----------------------------------

Behavior ADNosTaskMgr( ) {
      While( 1 ) {
                // wait for signal from TASKENDsvc
                process WaitForSignal();

// remove first task from input queue and signal it
                Receive( task_id ) {
                        If ( TASKtrace ) {
                                Print stringFormat(" %.6f" ,simGetTime()),
                                        "ADNosTaskMgr: task", task_id, "resumed";

}
                        threadSignal( task_id );
                } Reply();
        }
}

// NFS server behavior
// ------------------
Behavior ADNosNFS( ) {
        osSetData(" svcState", 1);
        processSetNoThreadUtilizationStats();
```

FIG. 2-11

```
While( 1 ) {
    Receive(type,arg1,arg2,arg3,arg4,arg5,arg6) Thread {
        Switch( type) {
            Case( "client_side" ) {
                // save client process id
                execute_proc = messageGetSendingProcessId();
                processSetClientProcessId( execute_proc ); // c_proc->client_proc_sn =
                                                                        execute_proc
                If ( arg3 == ReadType) {
                    msgSendLength = RPCreadReq;
                    msgReplyLength = arg4;
                }
                Else { // WriteType
                    msgSendLength = arg4;
                    msgReplyLength = RPCwriteAck;
                }

// forward request to remote server
                // ( msg->client_proc_sn = c_proc->client_proc_sn)
                Send arg1 (" server_side" ,arg2,arg3,arg4,arg5,arg6,execute_proc) Message
                                                                        msgSendLength
                        Protocol "UDP/IP" Wait();

// post completion event to Execute statement synchronization control
                If ( ! arg6 ) { // not a volume manager request
                    hrSetData(HRpostExecute,execute_proc) ;
                }
            }
            Case( "server_side" ) {
                processSetClientProcessId( arg6 ); // execute_proc
                If ( arg5 ) {
                    // volume request
                    Send osGetData("osVolMgr") (arg6,argl,arg2,arg3,arg4,arg5); // async
                }
                Else {
                    // disk request
                    If ( arg2 == ReadType ) {
                        msgReplyLength = arg3;
                    }
                    Else { // WriteType
                        msgReplyLength = RPCwriteAck;
                    }
                        // issue local IO request hrSetData(HRlocalIO,arg 1);
                    }
                }
            }
        } Reply() Message msgReplyLength;
    }
}
```

FIG. 2-12

```
Behavior ADNosVolumeMgr() }
    osSetData("svcState", 1);
    processSetNoThreadUtilizationStats()
    While(1) {

Receive( execute_proc, io_req, req_type, req_kbytes, first_kbytes_offset, volume_handle) Thread {

If ( !execute_proc ) { // local request
                    execute_proc = messageGetSendingProcessId();

}
            processSetClientProcessId( execute_proc );

// collect statistics
            volBeginRequest( volume_handle, execute_proc );
            request_start_time = simGetTime();

// for each volume IO request in Execute statement
            kbytes_offset = first_kbytes_offset;
            kbytes = req_kbytes; // total bytes in this I/O request ( Bytes * Number)
            stripe_kbytes = volGetStripeSize(volume_handle);

// process first stripe, partial stripe up to a stripe boundary, or full request
            mod_kbytes_offset = RMod(kbytes_offset,stripe_kbytes);
            curr_kbytes = RMin(stripe_kbytes-mod_kbytes_offset,kbytes);

// modify Number field of original request (to avoid setting it each time)
            hrSetDataX(HRioReqNumber,io_req, 1);

// save the disk number as the reference point for a complete pass through
            // all of the disks in the volume
            first_disk_number = vol GetStripedDiskNumber( volume _handle,kbytes_offset);
```

Join

FIG. 2-13

```
            // loop until all of the data has been processed

While ( kbytes > 0.0005 ) {

Join { disk_number = volGetStripedDiskNumber( volume_handle,kbytes_offset);

// loop over each disk on volume once while there is more data

While ( ( disk_number > = 0 ) && ( kbytes > 0.0005 ) ) {

// for each piece of an I/O request
                        Thread {
                            // declare client process for associating statistics
                            processSetClientProcessId( execute_proc );
```

FIG. 2-14

```
If ( kbytes > curr_kbytes ) {
// copy original I/O request
ioReq = hrGetDataX(HRioReqCopy,io_req);
}
Else {
                // use original I/O request
                ioReq = io_req;
        }

// modify selected fields
                hrSetDataX(HRioReqDisk,ioReq,disk_number );
                hrSetDataX(HRioReqKbytes,ioReq,curr_kbytes );

// issue local IO request
                hrSetData(HRlocalIO,ioReq);
}
kbytes_offset = kbytes_offset + curr_kbytes;
kbytes = kbytes - curr_kbytes;
curr_kbytes = RMin(stripe_kbytes,kbytes);

disk_number = volGetStripedDiskNumber( volume _handle,kbytes- offset);

If ( disk_number = first_disk_number ) {
        disk_number = -1;
        }
    } // While - loop over each disk on the volume once while there is more data
   } // Join - wait here until all the disks have completed
  } // While - loop while there is more data to be processed
 } // Join - wait here until all the data has been processed and all of the threads completed // post completion event to Execute statement synchronization control
    // when all pieces of this request have been completed
    hrSetData(HRpostExecute,execute_proc) ;

// collect statistics
    volEndRequest( volume_handle, execute_proc, request_start_time);
  } Reply();
 }
}

// user defined OS behavior include statements
//---------------------------------------------

// Include "user_OS_behaviors.adn"; // <== sample syntax
```

FIG. 3-1

```
// $Header: /ST/Trunk/Model/system.adn 81  12/19/00 1:11p Dan $
// System.adn - 12/21/2000 09:00

// ------------------------------------------------
// Copyright Hyperformix, Inc., 1996-2000.
// This software, including the program, help files and documentation, is
// owned by Hyperformix, Inc.
// The software contains information which is confidential and proprietary
// to Hyperformix, Inc. Access to and use of the software is available only
// through a nonexclusive license agreement with Hyperformix, Inc.
// The use of this software is controlled by that license agreement and any
// other use or copying of the software will violate the license and is
// expressly prohibited.
// ------------------------------------------------------------------------ package "OperatingSystemPackage";                   ~312

//=======================================

// Operating system interface constants (must match Strategizer internals)
// *** WARNING: changes in this section will cause execution time failure    ~320
// =======================================

// The Strategizer Operating System Model has been modified for release 2.2
// to take advantage of the new ADN object-oriented extensions.
// Strategizer users can extend this SES supplied capability by using the
// the new user_extensions.adn option.
// ------------------------------------------------------------------------

// INTRODUCTION

// The operating system exists as an instance of the class ses_OperatingSystem
// and a layer of software logic implemented in its behavior methods and
// associated server processes. This layer of logic lies between software
// processes running in application problem state and the underlying hardware.

// An association is made between an operating system name (the first column in the
// CSE.ops file) and an ADN OS behavior name (the sixth column of the CSE.ops file).
// Note that the operating system names are selected from a list (based on the
// CSE.ops file) via the GUI for each computer in a Strategizer model.
```

FIG. 3-2

```
// Instances of an operating system are created for each computer that runs an
// operating system with an associated ADN OS behavior name by invoking that
// behavior to instantiate an OperatingSystem object and call its
// initializeSvc behavior.
// The default for this release is to define the ADN behavior "ADNosSvc" for
// all the named operating systems. The operating system name is passed as a
// parameter to the operating system instance constructor.

// A knowledgeable Strategizer user can create a new operating system class by
// extending the OperatingSystem class supplied by SES in this file (System.adn).
// Such user extensions must be placed in the specially named user_extensions.adn
// file for proper processing.

// ADN PROCESSES AND STATE

// Software processes can execute in problem state and additionally in supervisor
// state (a new feature since release 2.0).

// Processes that startup in problem state switch to supervisor state at specific points
// (OS hook locations) to execute an operating system service and then return to problem
// state.

// Processes that startup in supervisor state (the OS server processes) remain in
// supervisor state.

// -----------------------------------------------------------------------
// OS behavior hooks are implemented as methods of an instance of the ses_OperatingSystem class
// or a user extension thereof specified in the user_extensions.adn file.
// The logic located at each hook is described along side the corresponding hook constant.
// Note: The hook constant is required on the return from each method as part of the hook
// protocol mechanism.
// -----------------------------------------------------------------------

Constant INITIALIZEsvc = 0;  // The initializeSvc behavior is executed once for each associated
                             // computer by a special initialization process after a new instance
           302               // of the ses_OperatingSystem class is created. These actions are taken
                             // by the ADN OS behavior (named in col. 6 of the CSE.ops file).
                             // The purpose of this logic is to create the associated server
```

FIG. 3-3

// processes that make up part of the operating system.
// The operating system state data is maintained in the OperatingSystem
// instance field variables.
// The initializeSvc behavior of the ses_OperatingSystem class should
// be called as the first statement in any intializeSvc overriding
// behavior specified by the user to assure that the basic operating
// system services are properly initialized.
// Refer to the initializeSvc behavior logic for additional details.

// In the following hooks the active process switches from problem to supervisor state and executes the
// corresponding operating system service behavior. The hook constant value is passed back as the only
// return parameter. When the service is completed, the active process returns to problem state.

Constant EXECUTEsvc = 1;   // The executeSvc behavior receives control when the Execute statement is ready
                           // to be sent to the hardware.
                           // Individual elements in the request vector (prepared from the Execute
                           // statement) are checked for remote disk IO and IO operations involving
                           // files located on volumes. Substitution or modification of the original
                           // requests are made as appropriate. The requests are then passed on to
                           // the hardware model.
                           // Refer to the executeSvc behavior logic for additioanl details.
                           // Note: It is strongly recommended that this behavior not be overriden
                           // by the user unless all the original logic is also included.

// The following set of four hooks are designed to work together to provide support for the implementation
// of communication protocol logic. This is expected to be the main part of the operating system logic that
// most users may be interested in extending.
// The service behaviors provided with release 2.2 contain no logic other than to surface addressability
// to the ses_Message object instance associated with the operation. The declaration for the ses_Message class
// is located in the Utilites.adn file.

// The following notes may help in use of the communication service hooks:
// - Synchronous messages execute the following sequence: sendSvc, receiveSvc, replySvc, and sendWaitSvc.
// - Asynchronous messages execute the following sequence: sendSvc then receiveSvc.
// - The sendSvc and replySvc are invoked just before passing control to the hardware.
// - The receiveSvc and sendWaitSvc are invoked just after returning from the hardware.

Constant SENDsvc = 2;   // The sendSvc behavior is executed at the end of the software part
                        // of Send statement processing, just before the request is sent to the
                        // hardware. Upon exit from this section, the resulting request is sent
                        // to the hardware.

FIG. 3-4

Constant SENDWAITsvc = 3;   // The sendWaitSvc behavior is executed early in the processing of an incoming
                            // message sent by the Reply clause of a Receive statement.
                            // Upon exit from this section, control is passed to the Wait clause of the
                            // original Send statement for processing of the message data fields.

Constant RECEIVEsvc = 4;    // The receiveSvc behavior is executed early in the processing of an incoming
                            // message from a Send statement.
                            // Upon exit from this section, control is passed to the Receive statement
                            // for processing of the message data fields.

Constant REPLY svc = 5;     // The replySvc behavior is executed at the end of the software part
                            // of the Reply clause (part of the Receive statement), just before the
                            // request is sent to the hardware.

Constant TASKSTARTsvc = 6;  // Updates active task count stats
                            // Increments active task count
                            // Issues warning first time maximum count is issued Constant TASKENDsvc = 7;    // Updates active task count stats
                            // Decrements active task count

```
// ----------------------------------------------------------------
// The "hr" (hardware request data) utility functions are used to access specific data necessary
// to support the current operating system functionality. In release 2.0 this is limited to requests
// generated by the Execute statement.
// The constants defined below are used in combination with the following data access utility
// functions hrGetData|hrSetData to access scalar values, and hrGetDataX/hrSetDataX to access
// vector (or subscripted) values.

// CAUTION: In considering user defined extensions to the operating system the prospective user
// should become familiar with the data currently accessible at the ADN level.
// ----------------------------------------------------------------
```

Constant HRexecSize = 4;        // Used with hrGetData to obtain the size of the Execute request vector.
                                // The vector consists of the CPU request as first element (when present)
                                // followed by Read and/or Write requests elements.

Constant HRexecReqType = 5;     // Used with hrGetDataX to obtain the type of the Execute request element.
                                // Returns one of the following: ReadType, WriteType, SendType, or CpuType.

FIG. 3-5

Constant HRnfsProc = 6;         // Used with hrSetData and hrGetData to save and retrieve the process id
                                // of the local NFS process.

Constant HRioReq = 7;           // Used with hrGetDataX to obtain the handle to an IO request structure
                                // (element of the Execute vector).

Constant HRresetReq = 8;        // Used with hrSetDataX to set the specified element in the Execute request
                                // vector to null. This action is done when the original request element
                                // has been replaced by a more detailed operating system representation.

Constant HRlocalIO = 9;         // Used with hrSetData to initiate a local IO request using the specified
                                // IO request handle.

Constant HRpostExecute = 10;    // Used with hrSetData to post a completion event to the original Execute
                                // synchronization control logic. (All parts of an Execute statement must
                                // be completed before a process exits the Execute statement.)

Constant HRkbytes = 11;         // Used with hrGetDataX to obtain the total data bytes (in Kbytes) for the
                                // specified IO request Constant HRvolumeHandle = 12;   // Used with hrGetDataX to obtain the handle of the associated volume for
                                // LocVolType and RemVolType io requests.
                                // The handle is used by volGetStripeSize() and volGetStripedDiskNumber()
                                // volume manager utility functions.

Constant HRkbytesOffset = 13;   // Used with hrGetDataX to obtain the kbyte offset of the first IO record
                                // in the specified File based on the value of the FirstIo parameter on an
                                // execute Read or Write request. If FirstIo is not specified a random
                                // record number between 0 and max-1 is used as the first IO record.
                                // The offset is used by the volume manager to determine the disk on which
                                // the first IO record resides.

Constant HRreqType = 14;        // Used with hrGetDataX for Read and Write execute elements.
                                // Returns one of LocDiskType, RemDiskType, LocVolType, RemVolType.

Constant HRioReqCopy = 15;      // Used with hrGetDataX to make a copy of the specified IO request Constant HRioReqDisk = 16;      // Used with hrSetDataX to set the disk number for the specified IO request

FIG. 3-6

Constant HRioReqKbytes = 17;   // Used with hrSetDataX to set the amount of data to be transferred Constant HRioReqNumber = 18;   // Used with hrSetDataX to set the starting record for the specified IO request Constant HRlocalVIO = 19;   // Used with hrSetData to initiate a local volume manager IO request using the specified
                            // IO request handle and applying physical attribute.

```
// ---------------------------------------------
// Hardware request element type.
// Returned by HRexecReqType when used with hrGetDataX.
// ---------------------------------------------
Constant ReadType = 0;
Constant WriteType = 1;
Constant SendType = 2; // currently not needed
Constant CpuType = 3;

// ---------------------------------------------
// IO request context type.
// Returned by HRreqType when used with hrGetDataX.
// ---------------------------------------------
Constant LocDiskType = 0;
Constant RemDiskType = 1;
Constant Loc V olType = 2;
Constant Rem V olType = 3;
Constant NonIoType = 4;

// ==========================================
// end of operating system interface constants ---------
// ==========================================

// miscellaneous parameters (used by ADNosNFS behavior)
// ---------------------------------------------

Constant RPCreadReq = 40.0 I 1024.0; // kbytes
Constant RPCwriteAck = 40.0 I 1024.0; // kbytes
```

FIG. 3-7

```
// task manager trace control (use for debugging only)
// -------------------------------------------------
Constant TASKtrace = 0;

// -------------------------------------------------
// remote IO distribution policy - used by NFS servers
// ------------------------------------------------- public associative gRemoteIoDistributionPolicy[100];

public function registerRemoteIoDistributionPolicy( tComputerName,              ⎫
userRemoteDistributionPolicyName) {                                             ⎬ 304
    gRemoteIoDistributionPolicy[ tComputerName] = userRemoteIoDistributionPolicy Name; ⎭

// ===================================================
// default operating system service "main" behavior (referenced in CSE.ops)  ← 310
// =================================================== public class ses_OperatingSystem {  ← 314

⎡ static integer    fTaskMaxWarningIssued = false;
      ⎢ static associative fActiveTaskCountStatsPtr[100]; ← 316
      ⎢
      ⎢ string         fOpSysName;
      ⎢ string         fComputerName;
      ⎢ integer        fMemoryStruct;
      ⎢ real           fPageSize;
      ⎢ real           fInstrPerPage;
      ⎢
      ⎢ integer        fOsMemMgr;
306 ⎨ string          fRemoteIoDistributionPolicy;
      ⎢
      ⎢ integer        fOsNFS;
      ⎢
      ⎢ integer        fOsTaskMgr;
      ⎢ integer        fTaskCountMax = -1;
      ⎢ integer        fTaskMaxReached = false;
      ⎢ ses_Statistic  fActiveTaskCountStats = null;
      ⎢ integer        fActiveTaskCount = 0;
      ⎢
      ⎣ integer        fOsVolMgr;
```

FIG. 3-8

```
ses_ThreadList  fThreadList;

constructor ses_OperatingSystem(aOpSysName,aComputerName,aMemoryStruct,
            aPageSize,aInstrPerPage) {
    fOpSysName = aOpSysName;
    fComputerName = aComputerName;
    fMemoryStruct = aMemoryStruct;
    fPageSize = aPageSize;
    fInstrPerPage = aInstrPerPage;
    fRemoteIoDistributionPolicy = gRemoteIoDistributionPolicy[stringNameBase(aComputerName)];
} behavior initializeSvc() {

//============================================
    // This logic is executed in 0 simulated time to initialize an instance of this
    // operating system on each computer that specifies ADNosSvc in the CSE.ops file.
    // The "operating_system_name" (second behavior parameter) corresponds to the // name in column one of the CSE.ops file. This name may be used to differentiate
    // between the initialization of differently named operating systems.
    //============================================ osSetData("operatingSystemInstance",this);

// osSetData("svcState",1);      // required for initialization process

// -----------------------------------------------
    // Startup Memory Pageout Manager (required by memory model)
    // (use priority of 100 for compatibility with rel 2.1)
    // -----------------------------------------------
    Startup fOsMemMgr = MemoryPageoutManager( fMemoryStruct, fPageSize,
            fInstrPerPage ) Priority 100;
    processSetName(fOsMemMgr,"mpm-"+fComputerName);

// OS service Master controls affect all operating system instances that
    // specify use of the ADNosSvc behavior in column 6 of the CSE.ops file.

// active tasks control process
```

FIG. 3-9

```
fTaskCountMax = osGetData("taskCountMax");
If ( fTaskCountMax > = 0 ) {
        Call initTaskMgr();
}

// NFS server process
Startup fOsNFS = ADNosNFS( this ) Priority 100 Options "NoStatsFlag";
processSetNameOnly(fOsNFS, "nfs-"+computerGetName());
registerSendDistributionPolicy2( fOsNFS, fRemoteIoDistributionPolicy );

// volume manager
Startup fOsVolMgr = ADNosVolumeMgr() Priority 100;
} behavior executeSvc() {
    //=====================================
    // this logic is executed in 0 simulated time to send any volume or remote IO requests
    // included in an Execute statement to the local Volume manager or NFS server
    //=====================================
    variable i;             // index variable
    variable execSize;      // number of request elements in the execute statement
    variable reqType;       // request element type: LocDisk, RemDisk, LocVol, RemVol, NonIo
    variable ioReq;         // I/O request handle
    variable Kbytes;        // Size in Kbytes of an I/O request
    variable KbytesOffset;  // Offset in file of first byte of data
    variable volumeHandle;  // Handle to volume where I/O data is located execSize = hrGetData(HRexecSize);
    i = 0;
    While( i < execSize ) {
            reqType = hrGetDataX(HRexecReqType,i);
            Switch ( hrGetDataX(HRreqType,i) ) {
                    Case( LocDiskType ) {
                            // no OS service required
                    }
                    Case( RemDiskType ) {
                            ioReq = hrGetDataX(HRioReq,i);
                            Kbytes = hrGetDataX(HRkbytes,i);
                            Send fOsNFS ("client_side",hrGetDataX(HRnfsProc,i),
                                    ioReq,reqType,Kbytes,0,0); // async
```

```
                hrSetDataX(HRresetReq,i,0);
        }
        Case( LocVolType ) {
                ioReq = hrGetDataX(HRioReq,i);
                Kbytes = hrGetDataX(HRkbytes,i);
                KbytesOffset = hrGetDataX(HRkbytesOffset,i);
                volumeHandle = hrGetDataX(HRvolumeHandle,i);
                Send fOs VolMgr (0,ioReq,reqType,Kbytes,KbytesOffset,
                        volumeHandle,0); // async
                hrSetDataX(HRresetReq,i,0);
        }
        Case( RemVolType ) {
                ioReq = hrGetDataX(HRioReq,i);
                Kbytes = hrGetDataX(HRkbytes,i);
                KbytesOffset = hrGetDataX(HRkbytesOffset,i);
                volumeHandle = hrGetDataX(HRvolumeHandle,i);
                Send fOsNFS ("client_side",hrGetDataX(HRnfsProc,i),
                ioReq,reqType,Kbytes,
                        KbytesOffset,volumeHandle); // async
                hrSetDataX(HRresetReq,i,0);
        }
        Case( NonIoType ) {
                // no OS service required
        }
      }
      i = i + 1;
    }
    return( EXECUTEsvc );
}

//=========================================
// The logic in the following four behaviors: sendSvc, sendWaitSvc, receiveSvc, replySvc
// is invoked on all application state logic originating from send/wait receive/reply
// ADN statements
//=========================================
behavior sendSvc(aMsg) {
        variable tMsg;
        tMsg = ses_Message.associatedMsg( aMsg );
        // < Insert optional logic here>
        tMsg.sendToHardware(tMsg.receiving_proc_sn,tMsg.message_bytes);
```

FIG. 3-11

```
        return( SENDsvc );
}
behavior sendWaitSvc(aMsg) {
        variable tMsg;
        tMsg = ses_Message.associatedMsg( aMsg );
        // < Insert optional logic here>
        return( SENDWAITsvc );
}
behavior receiveSvc(aMsg) {
        variable tMsg;
        tMsg = ses_Message.associatedMsg( aMsg );
        // <Insert optional logic here>
        return( RECEIVEsvc );
}
behavior replySvc(aMsg) {
        variable tMsg;
        tMsg = ses_Message.associatedMsg( aMsg );
        tMsg.sendToHardware(tMsg.receiving_proc_sn,tMsg.message_bytes);
        // < Insert optional logic here>
        return( REPLY svc );
}

//=========================================
// Maximum task control management
// o Keeps track of all active threads executing on computing node
// o Is controlled via the corresponding entry in the CSE.ops file
//=========================================

// ----- logic for release 3.0 behavior taskStartSvc( thid ) {
        fActiveTaskCount = fActiveTaskCount + 1;
        fActiveTaskCountStats.sample(1.0);
        If ( fTaskMaxReached == false ) {
          If (fActiveTaskCount == fTaskCountMax) {
            if ( fTaskMaxWarningIssued == false ) {
              fTaskMaxWarningIssued = true;
              Warning "***** First maximum concurrent task count reached.\n",
                " Check trace file for time of first occurence and computer name for each computer.\n",
                " Check report file \"Custom Statistics\" for active task count statistics for each computer. ";
```

FIG. 3-12

```
        }
        fTaskMaxReached = true;
        Print stringFormat("%.6f",simGetTime()),
        "***** Maximum concurrent task count limit reached for computer",
            "\" "+fComputerName+"\" ";
        }
    }
    return( TASKSTARTsvc );
} behavior taskEndSvc( thid ) {
    fActiveTaskCount = fActiveTaskCount - 1;
    fActiveTaskCountStats.sample(-1.0);
    return( TASKENDsvc );
} behavior initTaskMgr() {
    // create active task count user stat
    tStatsName = ses_ComputerStatName(fComputerName);
    if ( associativeArrayElementIsDefined(fActiveTaskCountStatsPtr,tStatsName) ) {
        fActiveTaskCountStats = fActiveTaskCountStatsPtr[tStatsName];
    }
    else {
        fActiveTaskCountStats = ses_gStatMgr.createContinuousStatistic
            ("TaskMgr_activeTasks_"+tStatsName);
        fActiveTaskCountStatsPtr[tStatsName] = fActiveTaskCountStats;
    }
}
}

// ------------------
// NFS server behavior
// ------------------

Behavior ADNosNFS( aServer ) {
        variable tExecuteProc;
        real tMsgSendLength;
        real tMsgReplyLength;

osSetData("svcState", 1);
```

FIG. 3-13 processSetNoThreadUtilizationStats();

```
While( 1 ) {
   Receive( aType,arg1,arg2,arg3,arg4,arg5,arg6 ) Thread {
      Switch( aType ) {
         Case( "client_side" ) {
            // save client process id
            tExecuteProc = messageGetSendingProcessId();
            processSetClientProcessId( tExecuteProc ); // c_proc->client_proc_sn = execute_proc
            If ( arg3 = = ReadType ) {
               tMsgSendLength = RPCreadReq;
               tMsgReplyLength = arg4;
            }
            Else { // WriteType
               tMsgSendLength = arg4;
               tMsgReplyLength = RPCwriteAck;
            }

// forward request to remote server
            send arg1("server_side",arg2,arg3,arg4,arg5,arg6,tExecuteProc) Message tMsgSendLength
               Protocol "UDP/IP" Wait();

// post completion event to Execute statement synchronization control
            // If ( ! arg6 ) { // not a volume manager request -- bug 3225 fix hrSetData(HRpostExecute,tExecuteProc);

// }
         }
         Case( "server_side" ) {
            processSetClientProcessId( arg6 ); // execute_proc
            If ( arg5 ) {
               // volume request
               // tMsgReplyLength = 0.0;
               tMsgReplyLength = arg3; // bug 3225 fix
               Send (aServer.IOs VolMgr) (arg6,arg1,arg2,arg3,arg4,volGetLocalHandle(arg5),
                  threadGetCurrentId()); //
async
               threadWaitForSignal();
            }
            Else {
```

FIG. 3-14

```
                        // disk request
                        If ( arg2 = = ReadType ) {
                                tMsgReplyLength = arg3;
                        }
                        Else { // WriteType
                                tMsgReplyLength = RPCwriteAck;
                        }
                        // issue local IO request
                        hrSetData(HRlocalIO,arg1);
                    }
                }
            }
        } Reply() Message tMsgReplyLength;
    }
}

//-------------------
// Volume manager behavior
// -------------------

Behavior ADNosVolumeMgr() {

// thread variables (separate copy for each)
        variable kbytes;
        variable kbytes_offset;
        variable request_start_time;
        variable stripe_kbytes;
        variable mod_kbytes_offset;
        variable curr_kbytes;

osSetData("svcState",1);
        processSetNoThreadUtilizationStats();

While( 1 ) {
                Receive( execute_proc, io_req, req_type, req_kbytes, first_kbytes_offset,
                    volume_handle, waitId ) Thread { osSetData("svcState",1);

If ( !execute_proc ) { // local request
                                execute_proc = messageGetSendingProcessId();
```

FIG. 3-15

```
}
processSetClientProcessId( execute_proc );

// collect statistics
volBeginRequest( volume_handle, execute_proc );
request_start_time = simGetTime();

// for each volume IO request in Execute statement
kbytes_offset = first_kbytes_offset;
kbytes = req_kbytes; // total bytes in this I/O request ( Bytes * Number )
stripe_kbytes = volGetStripeSize(volume_handle);

// process first stripe, partial stripe up to a stripe boundary, or full request
mod_kbytes_offset = RMod(kbytes_offset,stripe_kbytes);
curr_kbytes = RMin(stripe_kbytes-mod_kbytes_offset,kbytes);

// modify Number field of original request (to avoid setting it each time)
hrSetDataX(HRioReqNumber,io_req,1);

// save the disk number as the reference point for a complete pass through
// all of the disks in the volume
first_disk_number = volGetStripedDiskNumber( volume_handle,kbytes_offset);

Join {

// loop until all of the data has been processed

While ( kbytes > 0.0005 ) {

Join { disk_number = volGetStripedDiskNumber(volume_handle,kbytes_offset);

// loop over each disk on volume once while there is more data

While ( ( disk_number > = 0 ) && ( kbytes > 0.0005 ) ) {

// for each piece of an I/O request
                Thread {
                    // declare client process for associating statistics
```

FIG. 3-16

```
processSetClientProcessId( execute_proc );

If ( kbytes > curr_kbytes ) {
        // copy original I/O request
        ioReq = hrGetDataX(HRioReqCopy,io_req);
}
Else {
        // use original I/O request
        ioReq = io_req;
}

// modify selected fields
hrSetDataX(HRioReqDisk,ioReq,disk_number) ;
hrSetDataX(HRioReqKbytes,ioReq,curr_kbytes);

// issue local IO request
        hrSetData(HRlocalVIO,ioReq);
}
kbytes_offset = kbytes_offset + curr_kbytes;
kbytes = kbytes - curr_kbytes;
curr_kbytes = RMin(stripe_kbytes,kbytes);

disk_number = volGetStripedDiskNumber(volume_handle,kbytes_offset);
If ( disk_number == first_disk_number ) {
        disk_number = -1;
}
} // While - loop over each disk on the volume once while there is more data } // Join - wait here until all the disks have completed } // While - loop while there is more data to be processed } // Join - wait here until all the data has been processed and all of the threads completed // post completion event to Execute statement synchronization control
// when all pieces of this request have been completed if ( waitId ) {
        // request from NFS
        threadSignal(waitId);
```

FIG. 3-17

```
        }
        else {
                // local request
                hrSetData(HRpostExecute,execute_proc) ;
        }

// collect statistics
        volEndRequest( volume_handle, execute_proc, request_start_time );

} Reply();
  }
}

//===========================================
//-------------------------------------------
// this is a required operating system factory behavior
// its name should appear in column 6 of the CSE.ops file for all
// named operating systems that use the OperatingSystem class
//------------------------------------------- public behavior ADNosSvc( aSvcType, aArg2, aComputerName,
                aMemoryStructure, aPageSize, aInstrPerPage ) {
        variable t_OpSys;
        if ( aSvcType == 0 ) {
                tOpSys = new ses_OperatingSystem( aArg2, aComputerName,
                        aMemoryStructure, aPageSize, aInstrPerPage );
                call tOpSys.initializeSvc();
        }
}
```

318 (braces grouping the ADNosSvc behavior block)

OBJECT ORIENTED ADN AND METHOD OF CONVERTING A NON-OBJECT ORIENTED COMPUTER LANGUAGE TO AN OBJECT ORIENTED COMPUTER LANGUAGE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO COMPUTER PROGRAM LISTING APPENDIX SUBMITTED ON COMPACT DISC

A Computer Program Listing Appendix submitted on Compact Disc is included and the material contained on the Compact Discs is hereby incorporated by reference.

Copies 1 and 2 of the discs include the following:

| Name | Size | Type | Last Modified |
| --- | --- | --- | --- |
| adn30.1 | 26 KB | L File | Dec. 30, 2000 |
| adn30.y | 99 KB | Y File | Dec. 30, 2000 |
| ADNinterpreter30.sim | 517 KB | SIM File | Dec. 30, 2000 |
| ADNparser30.sim | 411 KB | SIM File | Dec. 30, 2000 |
| Dbms | 72 KB | Text Doc. | Dec. 30, 2000 |
| Server | 20 KB | Text Doc | Dec. 30, 2000 |
| Software_Util30.sim | 163 KB | SIM File | Dec. 30, 2000 |
| user_extensions | 5 KB | Text Doc. | Dec. 30, 2000 |
| Utilities | 56 KB | Text Doc. | Dec. 30, 2000 |

FIELD OF THE INVENTION

The field of the invention relates to converting a non-object oriented computer language to an object-oriented computer language more particularly, the invention relates to converting a non-object oriented computer language to an object-oriented computer language while maintaining existing code structure and data structures.

BACKGROUND

Computer languages have evolved over time as computer systems have become more complex and as instruction execution speed has increased. Society is becoming more dependent on computer systems and advance computer-programming languages. However, before the last decade, most computer programs were written in non-object oriented languages. The non-object oriented computer languages implemented simple logic statements which allowed the following: basic data input and output operations, implementation of subroutines which could be called and returned from, and the focus of the programmer to be placed on the procedures of the language or the program. Within the last several years however, a paradigm shift has occurred toward programming in an object-oriented language. In an object-oriented language, the programmer focuses on the data in the program and the methods that manipulate that data rather than focusing on the procedures of the language. Object-oriented languages are usually easier to understand. Examples of object-oriented language include C++ and Java.

In an object-oriented system, you solve your problem in terms of objects which occur in the context of the problem and objects are almost everything in common object-oriented systems. Objects allow you to define entities relevant to your particular program rather than strictly expressing your solution to a problem essentially in terms of characters and numbers as is required by non-object oriented language.

A class is a term used to describe a specification for a collection of objects with common properties. A class is also a collection of data and methods that operate on that data. The data and methods describe the behavior and state of an object. Classes are hierarchical, that is subclasses inherit behavior from the classes above it. A class describes the requirements for a collection of objects and may be thought of as a template which defines what makes up the particular object. A class definition of an object lists all the parameters that the programmer needs to define the object of that particular class. Instance variables or attributes of a class are commonly used to define these parameters. Objects can include the methods that operate on it as well as the data that defines the object. This allows for ease in programming. Typically, object-oriented programs take longer to design than non-object oriented programs, as care must be taken to design the classes that will be necessary for your program, however, object-oriented programs are also much easier to maintain and expand.

However, many businesses have spent considerable time, effort and money in developing computer programs to control all aspects of their organizations. Many of these programs were developed using standard programming techniques that were available prior to the development of object-oriented design. As such, businesses must consider the time necessary and the cost associated with modifying or replacing existing programs with easier to maintain object-oriented programs. Therefore, any advancement in the ability to convert a non-object oriented language program to an object-oriented language program would be advantageous.

SUMMARY OF THE INVENTION

Object Oriented ADN and a method for converting a non-object oriented language to an object oriented language is shown. First, an existing object oriented language must be selected. An object oriented language is selected to provide for ease of translation with regard to syntax and grammar. Second, the non-object oriented language is selected. This is the language the programmer desires to be converted to an object oriented language. The requirements for the new object oriented language are then defined. The requirements can be expressed in a document including a set of enhancements to be made to the existing language. Next, the specific syntax and grammar are selected. The object oriented extensions are then developed. The object oriented extensions allow for the existing language and data structure to be developed coextensive in the object oriented environment. Programs written in the existing language are still executable in the new object oriented language. Finally, the new object oriented language is prepared based upon the criteria outlined previously.

The Object Oriented ADN including an application logic function, data types and scopes, a class for message instancing, client workload models, server process infrastructure, database models, operating system models, statistics capability, utility classes, and garbage collection.

BRIEF DESCRIPTION OF THE DRAWINGS

A better understanding of the present invention can be obtained when the following detailed description of one exemplary embodiment is considered in conjunction with the following drawings, in which:

FIG. 2 is an exemplary embodiment of the existing ADN language code; and

FIG. 3 is an exemplary embodiment of the new object oriented ADN language code.

DETAILED DESCRIPTION OF EXEMPLARY EMBODIMENTS

Figure 1A:
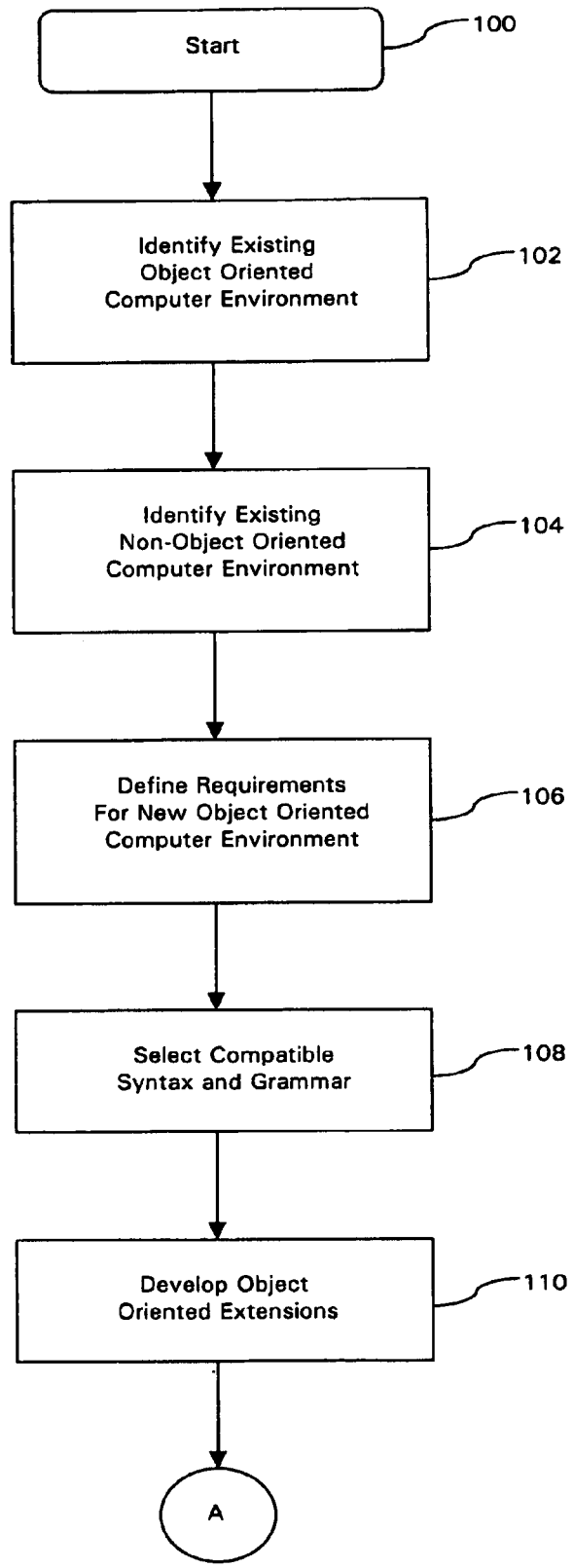
FIGS. 1A–1B are flow diagrams of the conversion to object oriented environments process.

In the description which follows, like parts are marked throughout the specification and drawings with the same reference numerals, respectively. The drawing figures are not necessarily drawn to scale and certain figures may be shown in exaggerated or generalized form in the interest of clarity and conciseness.

Figure 1B:
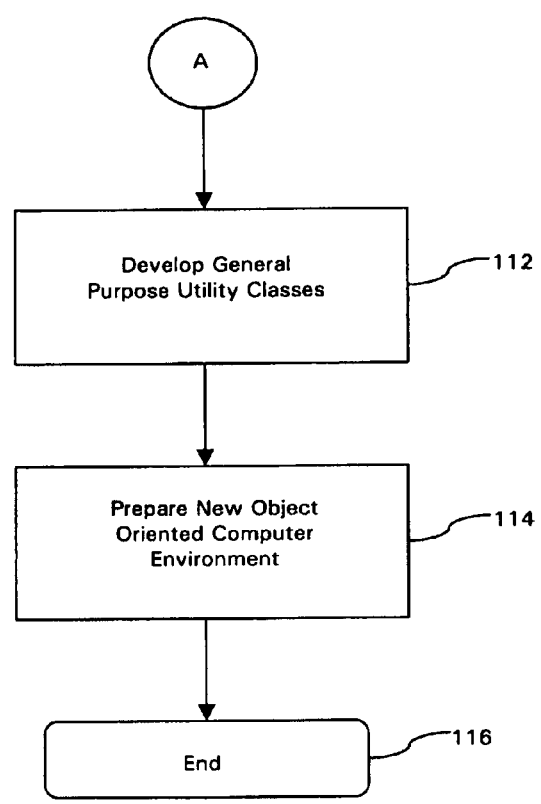

FIGS. 1A–1B illustrate a method of converting a non-object oriented computer environment to a new object-oriented computer environment. The process begins with Start 100 on FIG. 1A. Next, in Step 102, the existing object-oriented computer environment must be identified. An existing object-oriented computer environment would include commercially available object-oriented languages such as Java, which is provided by Sun Microsystems Inc. Typical benefits of a commercially available object-oriented computer language include improved application extendibility, maintainability, data hiding and encapsulation which makes code reuse easier, and the ability to allow the user additional power and flexibility to implement complex applications. Further, if Java is selected, the automatic garbage collection feature and associated object reference counting design is particularly useful in certain languages, especially simulation language. Java's syntax is also based on C++ language syntax. Java's selection may also be appropriate if the legacy language is also based on C or C++ language syntax. Next, in Step 104, the non-object oriented computer environment is identified. The non-object oriented computer environment includes languages which implement structure other than the object-oriented methodology and are desired to be converted to an object oriented system. Thus, older existing languages which pre-date the use of object-oriented analysis and design are potential candidates for this conversion. In one embodiment, the Application Definition Notation (ADN) language would fall in this category as ADN is a special purpose programming language for scripting the behaviors of clients and servers and is not written in an object oriented form. ADN was especially designed for use with a simulation tool and includes the features to handle concurrency, message passing, simulation time management, and simulated resource usage. The ADN features include C-like assignment in control flow statements, variables having different scopes and lifetimes, concurrent programming using threads and processes, simulation control and resource usage statements, input/output statements and a wide variety of built in functions. Next the requirements for the new object-oriented computer environment must be defined in Step 106. A requirements document can be produced from a set of enhancement requests and an understanding of the non-object oriented computer environment. Further, basic requirements such as reusability would factor in the determination of defining the requirements. The requirements document can be used to identify any future functionality or improved functionality of the non-object oriented computer environment. Also, the requirements document can identify functionality present in the non-object oriented computer environment which will be advanced through the modification or conversion to the object-oriented computer environment. Next in Step 108, compatible grammar and syntax is selected. The grammar and syntax of the new object-oriented computer environment must be compatible with the non-object oriented computer environment. The compatibility is necessary as the non-object oriented computer environment language is to be extended to provide the new object-oriented capabilities. The beginning of the selection of the grammar and syntax occurs in Step 102 during the identification of an existing object-oriented computer environment. The existing object-oriented computer environment should be selected so that a standard object-oriented language specification is available and can be used as a reference document. Within this reference document, the use of the semantics of the reference language can be used as a guide to ensure that the functionality is implemented as part of the object-oriented conversion. Further, when the syntax or grammar is not exact, then the non-object oriented computer environment syntax should be followed as closely as possible to minimize the effort in determining the new object-oriented capabilities. Any language key words not present in both the existing object-oriented computer environment and the non-object oriented computer environment should be reserved for use in subsequent implementation. Next, the object-oriented extensions are developed in Step 110. The object-oriented extension design should satisfy several goals. First, the object oriented computer environment should not burden the legacy system user in cases where the new OO functionality is not used. The interface to the new OO features should appear natural and easy to learn for the legacy system user. Second, the object oriented features of the new object oriented computer environment should be able to access the non-object oriented computer environment information so that existing applications can take full advantage of the new object oriented functionality. The non-object oriented computer environment application integrity should be preserved through the internal creation and management of key structures including structures as processes, threads and/or messages.

In one embodiment, to preserve the integrity of the legacy system while giving the user more control, an object implementation was designed to include a header structure and a data structure. The object header structure was defined for use by all objects in the design. The mapping of all user-defined information is made to secondary structure. The object header points to either a user defined structure or a non-object oriented computer environment data structure. By this approach, the non-object oriented computer environment information can be accessed in the same way as other object-oriented information. Second the object reference type was added to the semantics of the non-object oriented computer environment generic variable so that it was able to access any type of information in the new object-oriented computer environment. Next in Step 112 on FIG. 1B, the general purpose utility classes were developed. No general purpose utility classes existed in the non-object oriented computer environment. Therefore, to drive the full functionality of object-oriented operations, the general purpose utility classes must be added. Next in Step 114 the new object-oriented computer environment is prepared. In preparing the new object-oriented computer environment, the requirements defined, the grammar and syntax selected, and object-oriented extensions must be considered to implement and develop the new object-oriented computer environment to accomplish the goals of completeness and ease of use. These steps of preparing the new object-oriented computer environment and in particular, the actual code generation, is not listed herein for brevity as various methods are available for code generation once the requirement specifications, grammar and syntax selected, and object-oriented extensions are developed. Any of various common code generation techniques are usable and their use does not detract from the spirit of the invention. The method ends in Step 116.

Referring now to FIGS. 2 and 3, examples of the ADN code and object-oriented ADN code are shown respectively. FIG. 2 includes a portion of the ADN code which was prepared prior to the conversion to the object-oriented ADN. The file shown is the system.ADN. FIG. 3 shows the object-oriented ADN code for the system.ADN after conversion to the object-oriented ADN. Through the method described previously, the ADN code was transformed to object-oriented ADN. The object-oriented ADN however, still possesses many of the same parameters and data structures contained in the original ADN. For example, on page 2 of FIGS. 2 and 3, the variable constants INITALIZEsvc 202 and 302 are set to zero in both figures. However, on page-7 of FIG. 3, the object-oriented functionality and syntax can be seen when the classes are address through the use "PUBLIC" statements 304. Further, on page-7, the class and instance variables are declared 306. However, as can be seen on page-9 of FIG. 3 and page-8 of FIG. 2, the ADN program language which was used in the pre-object-oriented and 204, is present in the object-oriented and 308. Therefore, implementing the method describe herein, the functionality and data accessibility was imported from the non-object-oriented language to an object-oriented language.

The controlling code for the object oriented ADN, which was prepared according the to method described previously, is attached hereto as Attachment A. The object-oriented ADN is a programming language for simulating the behavior of computer systems. The object-oriented ADN now supports multiple object-oriented features including classes, inheritance, constructors, method overloading, packages, interfaces and abstract classes. The class describes a collection of data objects (i.e. constant, variables and arrays) and methods (i.e. behaviors, functions and constructors) that may use data objects. The definitions may include constants, variables, arrays, behaviors, functions and constructors. If the declaration of an object is preceded by the keyword "public", then the object is visible outside the class. Otherwise the object is only visible within the class. The class is nothing but a template. Defining a class allocates no storage to the data objects in the class. It is the instances of the class that allocate storage and manipulate the data.

A constructor is a special function within a class that is evoked automatically when a class is instantiated. The name of the constructor must be the same as the name of the class. The body of the constructor must execute in zero simulation time. Simulation time is calculated, not recorded as actual time. Simulation time is the amount of time necessary to accomplish a task if the task was being done in an actual computer system. As the software is simulating the computer system, the software can execute tasks with zero simulation time, thus that time is not included in the time analysis of the computer system. Simulation time is important because performance statistics are calculated from the simulation times at which events occur. Simulation time is maintained in a double precision floating point variable that measures the number in seconds from when the simulation begin.

A behavior is a collection of ADN code that is invoked as a procedure. Its body may take simulation time to execute. It can take parameters as inputs and can return multiple values as outputs. A variable is declared by specifying its type, its name, and an optional initial value. A constant is a variable or array whose value cannot change during execution. A constant is created by preceding the declaration of a variable or array with the keyword "final".

A class is instantiated using the new operator. Instantiating a class creates a new instance of the class by allocating the needed storage, invokes a constructor for the class with the provided parameter values and returns a reference or pointer to newly created instance.

Within a class there may exist multiple functions or multiple behaviors having the same name, as long as each function or behavior has different number of parameters. This is called "Method Overloading". When an overloaded function or behavior is invoked, the version having the same number of parameters as values being passed is invoked. Method Overloading allows implementing several variations on a method and can be used in place of a single method having a variable number of parameters.

A package is a collection of constants, variables, arrays, behaviors, functions, classes and interfaces. A package is used to group related objects, making some of the objects visible outside of the package and hiding others within the package. A package is not instantiated. The objects in a package are referenced using their simple names. If the declaration of an object in a package is preceded by the word "public", then that object is visible outside the package. Otherwise, the object is visible only within the package. If the same name appears in multiple package directives, all the objects are considered to be a part of the same package. This allows a package to be defined in a non-contiguous pieces spanning several files.

Several key ADN features in existence before the object-oriented extension were enhanced during the conversion, adding significant value to the objected-oriented ADN. The features are as follows:

Application Logic

Originally, ADN application logic was exclusively implemented in ADN global behaviors that resemble conventional programming subroutines. Simple logic statements were provided for conditional testing, looping, and data input and output operations. Performance statements were provided to account for hardware resource usage. Simulated send and receive statements were provided for inter-process communication. A set of built-in utility functions rounds were available to behaviors.

After Object Oriented ADN, application logic could also be defined in class behaviors providing logic encapsulation, a key feature in Object Oriented ADN reusability. In addition, the user-defined Object Oriented ADN function was introduced in both global and class-contexts. The Object Oriented ADN function is limited to zero simulated time logic that can be invoked within the context of an expression evaluation. The class-context function is equivalent to the traditional Object Oriented method. The class constructor, a special function, was added for the initialization of a newly instantiated object. This can be seen through a comparison of the application logic 206 of the pre-Object Oriented ADN shown in FIG. 2 with the application logic 310 of the Object Oriented ADN shown in FIG. 3.

Data Types Before

Object Oriented ADN, data consisted of type-less constants, variables, and arrays that took on the type of the data currently being held. Valid data types were Integer, Real, String, and Undefined. To conserve memory, 1, 2, 4, 8, and 16 bit array elements were also available. Associative arrays provided a means of storing a data values with a string value as a subscript.

After Object Oriented ADN, the former type-less variables are given the type designation of Generic. The object reference is added to the generic type. In addition, strongly typed variables of Integer, Real, String, and class-type are added to provide the same data type capability available in traditional Object Oriented languages such as Java. Examples can be seen in the adn.y file attached as the computer program listing appendix submitted on compact disk and include the following:

```
array_init_list: expr
        { $$ = 1; }
    | array_init_list ',' expr
        { $$ = $1+1; }
    | array_init_list ','
        { $$ = $1; }
    ;
data_element_type: GENERIC
        { $$ = (Inst *)GENERIC; }
    | VARIABLE
        { $$ = (Inst *)GENERIC; }
    | CONST
        {
            modif\= FINAL_mo;
            $$ = (Inst *)CONST;
        }
    | STROP
        { $$ = (Inst *)STROP; }
    | REALOP
        { $$ = (Inst *)REALOP; }
    | INTOP
        { $$ = (Inst *)INTOP; }
    | TYPE
        { $$ = (Inst *)$1; }
    | STRING
        {
            $$ = (Inst *)$1; data_element_token = STRING;
        }
    | ASSOCIATIVE
        { $$ = (Inst *)ASSOCIATIVE; }
    | DATUM
        { $$ = (Inst *)DATUM; }
    | INTOP ICONST BIT
        {
            if( strcmp($2,"16") == 0 ) {
                $$ = (Inst *)INTEGER16;
            }
            else if( strcmp($2,"8") == 0) {
                $$ = (Inst *)INTEGER8;
            }
            else if( strcmp($2,"4") == 0) {
                $$ = (Inst *)INTEGER4;
            }
```

-continued

```
            else if( strcmp($2,"2") == 0) {
                $$ = (inst *)INTEGER2;
            }
            else if( strcmp($2,"1") == 0) {
                $$ =(Inst *)INTEGER1;
            }
            else {
                yyerror("Invalid Integer modifier");
            }
        }
    ;
data_element_type2: /* null */
        { $$ = (Inst *)GENERIC; }
    | GENERIC
        { $$ = (Inst *)GENERIC; }
    | STROP
        { $$ = (Inst *)STROP; }
    | REALOP
        { $$ = (Inst *)REALOP; }
    | INTOP
        { $$ = (Inst *)INTOP; }
    | TYPE
        { $$ = (Inst *)$1; }
    | STRING
        { $$ = (Inst *)$1; data_element_token = STRING, }
    | ASSOCIATIVE
        { $$ = (Inst *)ASSOCIATIVE; }
    | INTOP ICONST BIT
        }
            if( strcmp($2,"16") == 0 ) {
                $$ = (Inst *)INTEGER16;
            }
            else if( strcmp($2,"8") == 0 ) {
                $$ = (Inst *)INTEGER8;
            }
            else if( strcmp($2,"4") == 0 ) {
                $$ = (Inst *)INTEGER4;
            }
            else if( strcmp($2,"2") == 0 ) {
                $$ = (inst *)INTEGER2;
            }
            else if( strcmp($2,"1") == 0 ) {
                $$ = (Inst *)INTEGER1;
            }
            else {
                yyerror( "Invalid Integer modifier");
            }
        }
    ;
```

Data Scope

Before Object Oriented ADN, the available data scopes consisted of model global including behavior names, simulated file, table and index names. In addition there were process local, thread local, and behavior local data scopes.

After Object Oriented ADN, the data scopes were expanded to include package scope 312, class scope 314, and object instance scope 316. These added data scopes provide the data hiding and logic encapsulation necessary in the creation of reusable model components.

Process and Thread Instances

Before Object Oriented ADN, process and thread structure instances were created and managed by internal logic. Selected state data was accessible through a set of built-in functions.

After Object Oriented ADN, classes were defined for processes and threads. Examples can be seen in the Utilities.adn file attached as the computer program listing appendix submitted on compact disk and include the following, noting that the constructors are native and private:

```
//----------------------------------
// *** process and thread support ***
//----------------------------------
// must match front end of t_Process structure definition in
Software_Util
// allows any defined fields to be accessed by ADN
    public final class ses_Thread {
        private integer         reserved;
        private Integer         object_ptr; // ptr to associated
                                t_Object
        private                 ses_SharedMessageQueue
fSharedMessageQueue;
        private native constructor  ses_Thread( ); // used internally
    {
    public final class ses_Process {
        private integer         object_ptr; // ptr to associated
                                t_Object
        private ses_Thread      fMainThread;
        private ses_SharedMessageQueue  fSharedMessageQueue;
        native private constructor  ses_Process( ); // used internally
    }
```

Message Instances

Before Object Oriented ADN, message structure instances were created and managed by internal logic. Selected state data was accessible through a set of built-in functions.

After Object Oriented ADN, a class was defined for the message. Through this class, message fields may be accessed by the ADN user. The server classes use this class to handle the routing of service requests to the corresponding service behavior. Instances of the message class are accessible in the operating system logic where message activity is intercepted. Examples can be seen in the Utilities.adn file attached as the computer program listing appendix submitted on compact disk and include the following, noting that the constructors are native and private:

```
//-----------------------
// *** message support **
//-----------------------
// must match t_Msg structure definition in Software_Util.Mes-
sage.sim
    public final Class ses_Message {
            private native constructor ses_Message(msg_ptr)
Returns(msg_ref);
            public native static function associatedMsg(msg_ptr)
Returns(msg_ref);
            public native function sendToHardware(target_id, Kbytes)
Returns( );
                private Integer object_ptr; // ptr to associated t_Object
                private integer statStack; // t_StatStack *
                private Real send_time;
                private Real receive_time;
                private Real reply_time;
                public Real    message_bytes;
                public Datum   data[]; // struct Datum *, also int ndata
                    private Integer nextMsg; // t_Msg *
                public Integer sending_proc_sn;
                public Integer receiving_proc_sn;
                    private Integer client_proc_sn;
                    private Integer timeout_proc_sn; // <0 means stale
                public Integer msg_protocol; // protocol
                    private Integer iDbTransaction; // associated transaction of
sending proc
                    private Integer msg_type; // t_MsgType type;
                    private Integer 1 bit forward;
                    private Integer 1 bit svcState;
                    private Integer 1 bit local;
                    private Integer 1 bit xfrDb;
                    private Integer 2 bit passCount;
    }
```

Client Workload

Before Object Oriented ADN, the logic for a client workload was generated as an ADN behavior executing under a special user process. Client workloads initiated the execution of behavior logic on a computer. Workloads could include human factor think time or could be expressed in terms of inter-arrival time.

After Object Oriented ADN, the default functionality remains unchanged. By adding state data and additional logic, a user can define significantly more complex workload models. For example, the public factory behavior 318 of FIG. 3 is shown. A client workload object can be created in a similar manner.

Server Process. Before Object Oriented ADN, server processes were specified through a graphical user interface (GUI) which in turn generated ADN behaviors according to internally defined patterns and user supplied information. Services are specified by ADN behaviors supplied by the modeler.

After Object Oriented ADN, server process infrastructure was designed and implemented as ADN classes. The new server infrastructure can be seen in server.adn attached as the computer program listing appendix submitted on compact disk.

Database Server

Before Object Oriented ADN, a built-in Oracle model provided the only significant database modeling capability. This feature allowed for the definition of cache size, block size, and individual named tables and indexes sizes. The semantics for a database transaction were supported in terms of starting and committing a transaction and collecting response statistics per transaction type. A transaction could be defined in the logic of a behavior to use select, insert, update, and delete operations on table rows. Operations such as update could optionally simulate row level locking. Distributed, central, and parallel Oracle model functions were supported.

After Object Oriented ADN, users can create models that involve significant data modeling. An example of the database server modeling capability can be seen in dbms.adn attached as the computer program listing appendix submitted on compact disk.

Operating System

Before Object Oriented ADN, a default parameterizeable operating system model was supplied with the product. A user could create a modified operating system model although there was a substantial risk that the integrity of the model infrastructure would be compromised.

After Object Oriented ADN, the operating system model logic was encapsulated in an operating system class. With this new design, a user can safely extend the operating system without disturbing the original logic. Examples include the base operating system functionality 320 of FIG. 3 and a user defined operating system extension shown in user_extensions.adn attached as the computer program listing appendix submitted on compact disk.

Statistics

Before Object Oriented ADN, all statistics were built-in. The user was able to control which statistics would be collected and reported.

After Object Oriented ADN, a user definable statistics capability was implemented as a set of Object Oriented ADN classes. A user defined query of built-in statistics during simulation was also added. Examples can be seen in the Utilities.adn file attached as the computer program listing appendix submitted on compact disk and include the following:

```
public class ses_Statistic {
    // constants
    static final integer    discrete = 0;
    static final integer    continuous = 1;
    static final integer    delta = 0;
    static final integer    absolute = 1;
    // state fields (must match t_Statistic in ADNparser.Statistic
    private integer     fHandle;
    private integer     fType;
    private string      fName;
    private integer     fNpercentiles; // for liveDistribution
    // interface to Workbench statistic accessor methods
    // -----------------------------------------------
    public native function count( ) returns(number_samples);
    public native function deviation( ) returns(deviation);
    public native function duration( ) returns(duration);
    public native function maximum( ) returns(maximum_value);
    public native function minimum( ) returns(minimum_value);
    public native function mean( ) returns(mean_value);
    public native function name( ) returns(name_string);
    public native function reporting(state) returns( );
    public native function sample(value) returns( );
    public native function sampleAbsolute(value) returns( );
    public native function type( ) returns(type_string);
    public native function value( ) returns(last_sample);
    public native function variance( ) returns(variance);
    private native Function defineDiscrete(prefix) returns( );
    private native Function defineContinuous(prefix) returns( );
    private native Function registerQueryStatistic( ) returns( );
    public native Function isActive( ) returns( );
    public native function registerService(serviceRef,serviceName)
    returns( );
    // constructors
    // ------------
    // used by ses_StatisticsManager.createQueryStatistic
    // note: locateStatistic sets statType and statHandle
    public   Constructor ses_Statistic( aName) {
            fName = aName;
            fType = 2;    //query stat type
            this.registerQueryStatistic( );
    }
    public   Constructor ses_Statistic( aName, aIntervalWidth) {
            fName = aName;
            fType = discrete;
    }
    public function createIntervalStatistic( aName, aIntervalWidth) {
            ses_Statistic tIntervalStat;
            generic tStatMgr = ses_gStatMgr; // overcome lookahead
            problem
            tIntervalStat = new ses_Statistic( aName, aIntervalWidth );
            this.add_interval( "#UDD%d#" + aName, aIntervalWidth,
            tIntervalStat );
            tStatMgr.fDiscreteStatisticGroup.insertStatistic( tInter-
            valStat );
            return( tIntervalStat );
    }
    // used by ses_StatisticsManager.createDiscreteStatistic and
    //           ses_StatisticsManager.createContinuousStatistic
    public Constructor ses_Statistic( aUxxPrefix, aName, aType ) {
    fName = aName;
    fType = aType;
    switch ( fType ) {
            case( discrete ) {
            this.defineDiscrete( aUxxPrefix );
            }
            case( continuous ) {
            this.defineContinuous( aUxxPrefix );
            }
            default {
            Error "Invalid statistic type, must be discrete or
            continuous.";
            }
    }
  }
}
```

Utility Classes

Before Object Oriented ADN, there were no general-purpose utility classes.

After Object Oriented ADN, several utility classes were added, including the following: a list class for handling lists of objects; a list iterator class for accessing individual objects in a list; a semaphore class for use in controlling access to data; and logic that can only be processed by one thread at a time. Examples can be seen in the Utilities.adn file attached as the computer program listing appendix submitted on compact disk.

Garbage Collection

Before Object Oriented ADN, memory management of all dynamically created structures such as processes, threads, and messages were built-into the modeling system.

After Object Oriented ADN, memory management of the objects can be explicitly instantiated by a user. A system of object reference counts and automatic garbage collection were implemented based on the Java language semantics. The following functions were included and can be seen in ADNparser30.sim attached as the computer program listing appendix submitted on compact disk: init_gcproc, incr_ref-_count, decr_ref_count, and object_destroy.

Many of the advancements of the Object Oriented ADN are disclosed herein, however, the Object Oriented ADN code is attached as the computer program listing appendix submitted on compact disk, which is hereby incorporated by reference.

The foregoing disclosure and description of the invention are illustrative and explanatory thereof and various changes to the size, shape, materials, components, and order may be made without departing from the spirit of the invention.

What is claimed is:

1. A method of converting a non-object oriented computer environment to a new object oriented computer environment, the method comprising the steps of:
    identifying the existing object oriented computer environment;
    identifying the non-object oriented computer environment;
    defining requirements for the new object oriented computer environment;
    selecting grammar and syntax compatible with the non-object oriented computer environment;
    developing object oriented extensions, wherein an existing application of the non-object oriented computer environment remains executable and wherein the new object oriented computer environment accesses information of the non-object oriented computer environment; and,
    preparing the new object oriented computer environment, wherein the new object oriented computer environment includes requirements, grammar, syntax and object oriented extensions.

2. The method of claim 1, wherein the step of identifying an existing object oriented computer environment includes identifying a commercially available object oriented computer environment.

3. The method of claim 1, wherein the step of identifying the non-object oriented computer environment includes identifying a legacy non-object oriented computer environment.

4. The method of claim 3, wherein the legacy non-object oriented computer environment includes a user language interface and data structures.

5. The method of claim 3, wherein the legacy non-object oriented computer environment allows multiple users.

6. The method of claim 3, wherein the legacy non-object oriented computer environment includes a distributed environment.

7. The method of claim 6, wherein the non-object oriented computer environment allows simulation modeling for the analysis of the performance software executing in a computer system.

8. The method of claim 1, wherein the non-object oriented computer environment allows simulation modeling.

9. The method of claim 1, wherein the step of selecting grammar and syntax includes selecting the semantics of the non-object oriented computer environment.

10. The method of claim 1, wherein the step of selecting grammar and syntax includes selecting semantics compatible to the non-object oriented computer environment.

11. The method of claim 1, wherein the step of selecting grammar and syntax includes selecting the semantics of the existing object oriented computer environment.

12. The method of claim 1, wherein the step of developing object oriented extensions includes developing an object header structure and an object data structure.

13. The method of claim 12, wherein the step of developing an object header structure includes developing an object header structure that provides a unified object oriented interface to a user and internal objects.

14. The method of claim 12, wherein the step of developing an object data structure includes developing an object data structure containing a data structure of the non-object oriented computer environment.

15. The method of claim 1 further comprising the step of developing general-purpose utility classes.

16. The method of claim 1, wherein the step of preparing the new object oriented computer environment includes creating new code.

17. The method of claim 1, wherein the step of preparing the new object oriented computer environment includes creating an operating system.

18. The method of claim 1, wherein the new object oriented computer environment includes an object oriented computer language.

* * * * *

UNITED STATES PATENT AND TRADEMARK OFFICE
CERTIFICATE OF CORRECTION

PATENT NO. : 7,047,524 B1 Page 1 of 1
APPLICATION NO. : 09/753192
DATED : May 16, 2006
INVENTOR(S) : Daniel M. Braddock, Jr.

It is certified that error appears in the above-identified patent and that said Letters Patent is hereby corrected as shown below:

TITLE PAGE, ITEM (73) ASSIGNEE: SHOULD READ

--HYPERFORMIX, INC.          4301 Westbank Dr., Bldg. A, Suite 300
                             Austin, Texas 78764-6564--

Signed and Sealed this

Second Day of October, 2007

JON W. DUDAS
*Director of the United States Patent and Trademark Office*